Patented July 1, 1941

2,247,584

UNITED STATES PATENT OFFICE 2,247,584

PROCESS OF RECOVERING CHEMICAL FROM WASTE PULPING LIQUOR

Harold R. Murdock, Canton, N. C., assignor to The Champion Paper and Fibre Company, Canton, N. C., a corporation of Ohio No Drawing. Application June 17, 1937,
Serial No. 148,815

3 Claims. (Cl. 92—2)

This invention relates to an improvement in the recovery of pulping chemical from waste liquor resulting from a chemical digestion of wood, and is concerned more particularly with the provision of "make up" chemical in the recovery of pulping values from waste liquor of the sulphate process.

In recovering pulping values from the waste liquor of the sulphate (or "kraft") process it is conventional to concentrate the liquor, by evaporation of much of its water content, to incinerate the concentrated black liquor (usually, in an oxidizing atmosphere) to smelt the resulting black ash, in a reducing atmosphere, whereby to yield a "melt" containing sodium carbonate, sodium sulphide and a small amount of unreduced sodium sulphate, to dissolve the resulting melt in water, and to causticize the melt solution by addition thereto of lime—whereby to prepare a solution of pulping chemical in a form in which it may be used directly for pulping more wood.

In each such "cycle" of the pulping chemical considerable pulping chemical is lost or at least not commonly recovered, and hence fresh chemical must be added, at some convenient point in the cycle, to that recovered in order that the original quantity and "strength" of the pulping liquor may be maintained. In the sulphate process it is conventional to use as such added chemical (i. e., for the "make up") salt cake or sodium sulphate, and to add such salt cake to the waste material undergoing the recovery treatment at some point prior to the smelting step (e. g., to the black ash going to the smelter, or to the concentrated liquor going to the incinerator). The make up of salt cake in the sulphate process may vary between, say, 200 pounds and, say, 500 pounds per ton of dry pulp produced, depending upon the care in operation, the types of equipment employed, and other variables.

It has now been found that a "spent caustic" by-product from the treatment of oil may be substituted for all or part of the salt cake conventionally used as make up in the sulphate process. This spent caustic consists of or largely contains sulphidic salts of sodium, e. g., sodium sulphide, sodium polysulphide, sodium-hydrosulphide, and/or other sodium salts of sulphur-containing acids, without or usually with hydrocarbonaceous residues or other organic materials abstracted from the oil, and results from one or another of the many processes for refining petroleum oils. See chapter III, Chemical Refining of Petroleum, by Vladimir A. Kalichevsky and Bert Allen Stagner, published by The Chemical Catalog Company, Inc., New York, 1933.

Typical of what is meant by the expression "spent caustic" are the following compositions of three commercial by-products from an oil refinery:

| | Spent raffinate from $SO_2$ plant | Spent NaOH from treater | Spent NaOH from prewash |
|---|---|---|---|
| Specific gravity | 1.159 | 1.092 | 1.069 |
| Total solids—gpl | 180.2 | 141.0 | 112.4 |
| Ash—gpl | 187.2 | 121.8 | 96.4 |
| Reaction to phenolphthalein | Acid | Basic | Basic |
| Equivalents per liter of soln | 1.72 | .874 | .311 |
| Sulfur present as $SO_4$—gpl S | 2.22 | 4.18 | 1.26 |
| Total sulfur—gpl S | 70.2 | 6.70 | 5.27 |
| Alkali metals as sulfates—gpl | 188.0 | 142.6 | 100.1 |
| Pounds $Na_2SO_4$ per M gallons | 1570 | 1190 | 835 |

The above specific compositions are illustrative only and not restrictive, since the identities of the contents of sodium salts of the sulphur-containing acids, and their proportionate amounts, may vary rather widely in accordance with the process in which the original caustic soda was employed, the nature and relative amount of the sulphur-containing ingredient of the oil, and other variables.

It has been found that this by-product material may be added to the waste liquor from the "kraft" or sulphate process, at any suitable point prior to incineration but preferably after the waste liquor has been concentrated and before the same is fed to the incinerator, and may, with the solids content of said waste liquor, be incinerated and smelted, yielding additional pulping chemical mainly in the form of sodium carbonate, sodium sulphide and some sodium sulphate. If the "spent caustic" contains a material amount of combustible materials (organic, such as the aforesaid hydrocarbonaceous residues, or even inorganic) those combustible materials provide a part of the necessary fuel for the incineration thereby effecting some economy in fuel.

If the "spent caustic" is of such composition that when added to the waste pulping liquor and with the latter incinerated, smelted, leached and causticized, it would yield a product which would be deficient in sulphur, there may be added to the by-product spent caustic or to the waste liquor containing the latter an appropriate amount of a suitable -$SO_4$-containing material (e. g., sulphuric acid as such, or preferably, an oil refinery sulphuric acid sludge containing available —$SO_4$ ions) whereby to increase the sulphidity of the chemicals content of the mixture fed to the incinerator. Provided the spent caustic contains residual free alkali the so added acid sludge serves to neutralize some or all of the residual caustic alkali or alkali carbonate of this by-product spent caustic. Regardless of whether or not the added acid sludge "neutralizes" the spent caustic, it does serve correspondingly to increase the ratio of sulphur to sodium in the final product, and, moreover, there is, of course, more than enough residual alkalinity in the black liquor to neutralize the added acid sludge in case the spent caustic does not do so. It is preferred to treat the spent caustic with enough of the oil refinery sulphuric acid sludge (or of sulphuric acid, as such) to effect substantially complete neutralization of the free alkali content of the former, and to add the thus-neutralized spent caustic to the waste pulping liquor concentrate—in the amount required for make up of pulping chemical—just prior to incineration of said waste liquor concentrate or else directly to the incinerator contents by a feed separate from the waste liquor feed.

The following is given as an illustrative example of one mode of carrying out the concept of the present invention:

In the production of 1 ton (dry basis) of kraft pulp from wood chips there was employed a pulping liquor containing per liter about 28.5 grams of $Na_2S$, about 0.5 gram of $Na_2SO_4$, about 60.8 grams of $NaOH$, and about 11.7 grams of $Na_2CO_3$. In the "cook" an amount of this liquor was employed sufficient to represent a total of 1020 pounds of the pulping chemicals. It was determined that from the resulting waste pulping liquor there could be recovered only about 620 pounds, total, of pulping chemicals. The waste liquor was concentrated, in known manner, to a concentration of about 30° Bé. at 80° C.

To the concentrated waste liquor there were added 1685 pounds of an oil refinery by-product "spent caustic" which had been concentrated by evaporation and, at the time added, was of the following constitution:

| | | |
|---|---|---|
| Bé. at 60° F | deg | 26.91 |
| Sp. gravity | | 1.2278 |
| Sulphate ash (as $Na_2SO_4$) | lb/cu. ft | 18.22 |
| Per cent $Na_2SO_4$ (sulphate ash) | per cent | 23.77 |
| Titratable $Na_2O$ | lb/cu. ft | 4.20 |
| Per cent titratable $Na_2O$ | per cent | 5.48 |
| Active $Na_2O$ | lb/cu. ft | 0.05 |
| Per cent active $Na_2O$ | per cent | 1.37 |
| Per cent water | do | 74.73 |
| Per cent solids | do | 25.27 | and the resulting mixture was in known manner incinerated, smelted, leached, and causticized, yielding a kraft cooking liquor in an amount sufficient for the production of 1 ton (dry basis) of kraft pulp.

The value "sulphate ash" of the above analysis is obtained by evaporating the spent caustic to dryness, adding sulphuric acid in an amount at least sufficient to react with all of the base content of the evaporation residue, igniting the resulting product to a constant weight, and weighing the ignited product.

I claim:

1. In the process of recovering pulping chemical from the waste pulping liquor of the sulphate process involving incineration of the solids content of such waste liquor and smelting of the incinerated solids, the step which consists in adding to such waste liquor, prior to actual incineration, a sulphur- and sodium-containing by-product spent caustic from the treatment of oil, in an amount sufficient to make up the sodium content of the original pulping liquor.

2. In the process of recovering pulping chemical from the waste pulping liquor of the sulphate process involving incineration of the solids content of such waste liquor and smelting of the incinerated solids, the step which consists in adding to such waste liquor, prior to actual incineration, a sulphur- and sodium-containing by-product spent caustic from the treatment of oil, in an amount sufficient to make up the sodium and sulphur contents of the original pulping liquor.

3. In the process of recovering pulping chemical from the waste pulping liquor of the sulphate process involving incineration of the solids content of such waste liquor and smelting of the incinerated solids, the step which consists in adding to the waste liquors, after concentration of the latter and after the concentrated waste liquors have been fed into the incinerator but prior to their actual incineration, a sulphur- and sodium-containing by-product spent caustic from the treatment of oil, in an amount sufficient to make up the sodium and sulphur contents of the original pulping liquor.

HAROLD R. MURDOCK.